United States Patent
Hötger et al.

(10) Patent No.: US 6,941,854 B2
(45) Date of Patent: Sep. 13, 2005

(54) SLIDING PAIRING FOR MACHINE PARTS THAT ARE SUBJECTED TO THE ACTION OF HIGHLY PRESSURIZED AND HIGH-TEMPERATURE STEAM, PREFERABLY FOR PISTON-CYLINDER ASSEMBLIES OF STEAM ENGINES

(75) Inventors: Michael Hötger, Berlin (DE); Jens Kleemann, Berlin (DE); Axel Riepe, Berlin (DE); Walter Thiele, Bonn (DE)

(73) Assignees: SGL Carbon AG, Wiesbaden (DE); TEA GmbH Technologiezentrum Emissionsfreie Antriebe, Berlin (DE)

( * ) Notice: Subject to any disclaimer, the term of this patent is extended or adjusted under 35 U.S.C. 154(b) by 172 days.

(21) Appl. No.: 10/470,497

(22) PCT Filed: May 29, 2002

(86) PCT No.: PCT/DE02/01968

§ 371 (c)(1),
(2), (4) Date: Jul. 29, 2003

(87) PCT Pub. No.: WO02/099319

PCT Pub. Date: Dec. 12, 2002

(65) Prior Publication Data

US 2004/0067384 A1 Apr. 8, 2004

(30) Foreign Application Priority Data

Jun. 1, 2001 (DE) .......................... 101 28 055

(51) Int. Cl.⁷ ............................................. F01B 11/02
(52) U.S. Cl. ...................................................... 92/169.1
(58) Field of Search ........................................ 92/169.1

(56) References Cited

U.S. PATENT DOCUMENTS 4,549,862 A * 10/1985 Stich et al. ................ 418/133
5,332,422 A    7/1994 Rao
6,053,718 A *  4/2000 Schmidt et al. ............ 418/152

FOREIGN PATENT DOCUMENTS

| DE | 1957 908 | 7/1970 | |
| DE | 3406479 | 8/1985 | |
| DE | 43 18 193 A1 | 12/1993 | |
| DE | 43 18 193 A 1 | 12/1993 | |
| DE | 44 11 059 A 1 | 10/1995 | |
| DE | 196 51 069 A 1 | 4/1997 | |
| DE | 198 15 988 C 1 | 7/1999 | |
| DE | 299 06 867 U 1 | 9/1999 | |
| DE | 19815989 | 10/1999 | |
| EP | 0 258 330 B1 | 8/1987 | |
| EP | 0 258 330 B 1 | 8/1987 | |
| EP | 258330 B1 * | 8/1992 | F02F/1/00 |

* cited by examiner

Primary Examiner—Thomas E. Lazo
(74) Attorney, Agent, or Firm—Collard & Roe, P.C.

(57) ABSTRACT

A pair of sliding elements for machine parts exposed to high-pressure and high-temperature steam, preferably piston-cylinder arrangements for steam engines. The first sliding element is produced from a synthetic, fired but not graphitized carbon material which comprises graphitized carbon black and/or natural graphite as significant filler and whose pores are filled with metal, metal alloy, a ceramic, synthetic resin and/or pitch which has been carbonized, preferably in the form of a piston and/or piston ring. The second sliding element, preferably in the form of a cylinder liner or guide bush, comprising an iron-containing, high-temperature-resistant material which is preferably alloyed with chromium and/or nickel and is provided at least on the surface layer with a nitride layer.

23 Claims, No Drawings

SLIDING PAIRING FOR MACHINE PARTS THAT ARE SUBJECTED TO THE ACTION OF HIGHLY PRESSURIZED AND HIGH-TEMPERATURE STEAM, PREFERABLY FOR PISTON-CYLINDER ASSEMBLIES OF STEAM ENGINES

CROSS REFERENCE TO RELATED APPLICATIONS

Applicants claim priority under 35 U.S.C. §119 of GERMAN Application No. 101 28 055.6 filed on 1 Jun. 2001. Applicants also claim priority under 35 U.S.C. §365 of PCT/DE02/01968 filed on 29 May 2002. The international application under PCT article 21 (2) was not published in English.

DESCRIPTION

The invention relates to pairs of sliding elements for machine parts exposed to high-pressure and high-temperature steam.

The use of pairs of sliding elements which are made of materials such that they form a dry film and transfer material between the sliding surfaces in heat engines, preferably steam engines, having a piston drive, for operation in the presence of high-pressure steam, i.e. saturated steam at just below the critical point (T<374° C.), also known as sub-critical steam, is known from DE 299 06 867 U1. Self-lubricating materials used, inter alia, for piston rings include materials based on carbon, polytetrafluoroethylene or antimony-impregnated synthetic carbon. Synthetic carbon is a material which consists essentially of carbon and has an amorphous structure. It is distinct from graphite materials which consist at least partly of carbon which is crystalline with the graphite crystal structure. As surfaces against which the abovementioned materials run, it is also possible to use hard coatings, preferably Ceresit hard coatings.

The use of graphite impregnated with bismuth and nickel as encapsulation material for fuel elements in nuclear reactors is known from DE-A 1 957 908. This impregnated graphite is more stable than pure graphite at high temperatures in the presence of water or steam.

Bismuth alloys having a nickel content of from 8 to 27% by weight were found to have favorable properties. Impregnation of the graphite with a bismuth alloy containing 9% by weight of nickel is preferably carried out at a temperature of 800° C. and a nitrogen pressure of 20 kp/cm². Graphite which has been treated in this way can be used at an operating temperature of 460° C. When a bismuth alloy containing 25% by weight of nickel is employed, impregnation is carried out at 1250° C. and a pressure of 20 kp/cm². The graphite which has been treated in this way is suitable for operating temperatures up to 650° C.

In this document, aluminum and zirconium were also considered as impregnation metal, but it was found that these metals suffer from considerable corrosion on contact with graphite and in the presence of steam or water at the high operating temperatures of a nuclear reactor.

Under the abovementioned use conditions, graphite generally acts as a hydrogen electrode, so that all metals which have a positive electrochemical oxidation potential relative to such an electrode corrode under these conditions.

A measure of the corrosion resistance is the decrease in mass in mg/cm², based on the surface area of samples under the conditions described.

However, whether the graphite materials described can also be used as sliding materials at the operating temperatures indicated is not made clear for a person skilled in the art.

The production of pistons for an internal combustion engine from a material comprising an isotropic graphite matrix making up from 60 to 95% of the volume of the material and having a porosity in the region of not more than 10% is known from DE 43 18 193 A1. The pores of the graphite matrix are filled with an aluminum alloy. In the case of engines having a high working temperature range, the expansion is too high for matches with steel or iron materials. At high temperatures and in the presence of moisture, the aluminum alloy filling the pores is decomposed at the sliding surfaces, resulting in a reduced wear resistance and a reduced heat transfer.

Production of pistons based on an open-pored base body of isotropic graphite for internal combustion engines is known from DE 44 11 059 A1. The pore system of the base body is impregnated or filled with a metal from the group consisting of copper, antimony and silicon or else with alloys of these metals. A high hot strength of the pistons designed in this way is achieved.

DE 198 15 988 C1 discloses a guide arrangement in which the surfaces of two parts slide against one another. Particularly favorable behavior is achieved by unlike materials of the sliding surfaces, with the first material being from the group consisting of polycrystalline diamond, amorphous carbon, tetragonally coordinated carbon and metal-containing carbon and the second material being from the group consisting of mesophase graphite and ultrafine graphite.

DE 196 51 069 A1 discloses an oil-free and uncooled diesel engine with reciprocating pistons, but this does have piston rings. The reciprocating piston is formed by a working piston and a guide piston. The working piston has a smaller diameter than the guide piston and moves in an oscillating fashion without making contact relative to a working cylinder having a low thermal expansion and low thermal conductivity. This design is intended to achieve adiabatic operation. The working piston can be made of various materials, e.g.: fuzed silica, electrographite or graphitized carbon, while the working cylinder can comprise: fuzed silica, e.g. as is known for laser-spectroscopic studies, or Nilo 42 or GGG-NiCr 353, known as material for gas turbine housings. When a working piston made of electrographite is paired with a working cylinder made of Nilo 42 or GGG-NiCr 353, a tight fit of the working piston is possible due to the small differences in the coefficient of thermal expansion and thermal conductivity between the two materials.

Manufacturing the pistons and piston rings of piston engines from modified carbon in the form of pressed graphite, in particular electrographite, and making the surfaces of these parts resistant to burning is known from EP 0 258 330 B1. Cylinder liners of similar material but with a surface treated by carburization, silicization or nitridation or of ceramic materials, e.g. silicon carbide or nitride, are envisaged as sliding partners for the abovementioned parts.

It is an object of the invention to provide pairs of sliding elements in which a first sliding element, preferably a piston, piston ring or valve stem bush, slides with low wear against a second sliding element under an atmosphere of water vapor at high pressures and high temperature, in particular an atmosphere of supercritical steam, and preferably also in the case of exposure to liquid water.

The pairs of sliding elements according to the invention are found to be functional with only low wear in the case of piston and cylinder, piston ring and cylinder, piston, piston rings and cylinder or in the case of valves and associated valve stem guides and sealing elements of rotating piston machines or planetary rotation machines, e.g. sealing strips and shutoff valves and also housings, on exposure to steam at high pressures and high temperature, in particular supercritical steam, and preferably also in the presence of liquid water between the two sliding elements. They can therefore also be used advantageously for bearings exposed to steam and preferably also water.

If the pair of sliding elements consists of a valve and its guide bush, it is preferred that the valve is made of the heat-resistant material and the guide bush is made from the material consisting essentially of carbon.

The conditions under which the pairs of sliding elements according to the invention can still be used are characterized, in particular, by maximum pressures of from 20 bar to 600 bar, preferably from 40 bar to 120 bar and particularly preferably from 45 to 60 bar, and maximum temperatures of from 300° C. to 800° C., preferably from 400° C. to 650° C. and particularly preferably from 450° C. to 550° C., usually prevailing in the atmosphere of water vapor. Here, the pairs of sliding elements withstand all temperature ranges of the water vapor from 100° C. to the maximum temperature even when starting a steam engine. Furthermore, even the start-up of engines running dry preferably present no problem for the pairs of sliding elements according to the invention. Likewise, the pairs of sliding elements preferably withstand friction in water, preferably over a temperature range from −40° C. to +300° C., particularly preferably over a temperature range from 0° C. to +100° C. Preferred pairs of sliding elements are also able to be used in applications in which there is a temperature gradient having a temperature difference of usually 200° C., preferably even 300° C. and particularly preferably even 500° C., along the sliding surface.

In a preferred variant of the pair of sliding elements, both the piston and its piston ring in a sliding system of piston and cylinder consist of one and the same material consisting essentially of carbon, so that the problems experienced hitherto as a result of different coefficients of thermal expansion of piston and piston ring are avoided.

According to the invention, the sliding material consisting essentially of carbon of the first sliding element is a porous carbon body which is filled with a metal, a metal alloy or ceramic and comprises as functional constituent a comparatively poorly crystallographically ordered graphite based on heat-treated carbon black and/or natural graphite. The metal, metal alloy or ceramic which is introduced is selected on the basis of its behavior under conditions of water vapor at very high temperatures and pressures and, if appropriate, in the presence of lubricating additives. The metals antimony, nickel, silver and copper and alloys of these metals are preferred for this purpose, but particular preference is given to antimony. Likewise, carbonized synthetic resins and/or pitches can also be used as impregnation of the porous carbon bodies.

The second sliding element made of an iron-containing high-temperature-resistant material, preferably alloyed with chromium and/or nickel, is provided at least on the sliding surface with a nitride layer. It can also be produced by a powder-metallurgical route. The material preferably comprises 15–25% by weight of chromium and/or 25–40% by weight of nickel.

According to the invention, the second sliding element of the pair of sliding elements can, preferably as a cylinder liner or guide bush, also comprise a light metal alloy, preferably comprising two or more of the materials Al, Mg, Ti.

It is likewise possible, according to the invention, to produce the second sliding element from a powder-metallurgical material comprising iron or steel and titanium carbide. In principle, it can likewise comprise cemented hard material or have a sliding layer of cemented hard material.

If the second sliding element is, as preferred, a cylinder liner or guide bush, it can, according to the invention, be made of a ceramic composite. This can comprise, for example, titanium carbide, chromium and nickel. The ceramic composite advantageously further comprises manganese.

Likewise, the material of the second sliding element can be a carbon material which consists of or consists essentially of graphite. Examples are graphite-filled carbon materials whose binders have merely been carbonized, and graphite materials. These materials of the second sliding element are preferably impregnated with the fillers which can also be utilized for the first sliding element.

The material of the second sliding element of the pair of sliding elements according to the invention preferably also has a wear-protection layer. For this purpose, use is made, in particular, of titanium nitride, chromium nitride and chromium carbide layers and also amorphous diamond-like carbon layers (DLC layers).

All the abovementioned materials for the second sliding element ensure, together with a first sliding element comprising a porous carbon material which comprises as functional constituent graphite based on carbon black and/or natural graphite and has been filled with metal, metal alloy, ceramic or carbonized pitches and/or resins, low-wear sliding under the difficult operating conditions mentioned in the discussion of the object of the invention.

For the definition of the composition of the sliding materials consisting essentially of carbon which are used according to the invention for the first sliding element, the following terms of carbon technology are used:

Coke, named according to its starting material, e.g. as petroleum coke, black coal tar pitch coke or carbon black coke, is formed on heating the starting material to intermediate temperatures, not more than 1400° C.

Graphite is a synthetic carbon material which has been heated to temperatures of from 2300 to 3100° C. in an earlier process step.

A "fired" carbon material consists of carbon which has been heated to not more than 1300° C. in the absence of air.

A "graphitized" carbon material consists of carbon which, after calcination, has been heated at temperatures of from 2300 to 3100° C. in the absence of air ("graphitized").

Carbon black coke is a specific raw material which is not commercially available. Processes for producing it are described in the DE patent application PA 260 974 (of May 30, 1951) or the DE patent No. 958 278.

Graphitized carbon black is formed when fired bodies of carbon black coke are heated again, but in the absence of oxidants, to the graphitization temperature, i.e. to temperatures of preferably from 2300 to 3100° C.

The method used by the applicant for preparing graphitized carbon black is described below. Any carbon black is suitable as starting material. Preference is given to using commercial pigment blacks or filler blacks which have been produced by defined processes and have low contents of ash and hydrocarbons. It may be remarked that the presence of residual hydrocarbons in the carbon black is not in itself unfavorable for the preparation of carbon black coat. The carbon black is mixed in a known manner with a carbonizable, hydrocarbon-containing binder, if appropriate using auxiliaries which aid compounding, e.g. tars, oils or organic solvents, to give a shapable plastic mass.

Preference is given to using a commercial binder pitch as binder. The amounts of binder added are in the range from 35 to 65% by weight, based on the finished mixture=100% by weight. The mixing process is in this case preferably carried out above the softening point or softening range of the binder. The mixture obtained in this way is then shaped to form intermediate product bodies and the shaped bodies are fired at temperatures of up to 800 to 1400° C. in the absence of oxidants so as to carbonize the binder component present. The body which has been treated in this way consists of carbon black coke. However, graphitized carbon black is used for producing the material of the first sliding element of the pair of sliding elements. To obtain this, the fired carbon black coke bodies have to be additionally heated, once again in the absence of oxidants, to the graphitization temperature, i.e. to temperatures of preferably from 2300 to 3100° C. To obtain a material suitable for producing the first sliding element, the bodies of carbon black graphite are broken up and milled to a fine powder. All the above-mentioned process steps such as comminution, mixing, shaping, firing and graphitization are prior art.

The sliding material consisting essentially of carbon of the first sliding element is produced by preparing a dry mixture comprising from 30 to 100% by weight of graphitized carbon black and/or natural graphite, preferably from 45 to 90% by weight and particularly preferably from 60 to 85% by weight. Mixtures which do not consist entirely of graphitized carbon black and/or natural graphite further comprise one or more synthetic graphites, e.g. electrographite, Lonza graphite or Kish graphite, and inorganic additives such as silicon dioxide, natural and synthetic silicates, aluminum oxide or silicon carbide. Among these additives, electrographite and silicon dioxide are preferred. All components of the dry mixture are milled to a fine powder. Dry mixtures of this type have the following compositions:

from 30 to 100% by weight of carbon black graphite and/or natural graphite
from 0 to 55% by weight of synthetic graphite (either graphite similar to natural graphite or polygranular graphite)
from 0 to 15% by weight of inorganic additives.
A preferred dry mixture comprises
from 45 to 90% by weight of carbon black graphite and/or natural graphite
from 10 to 38% by weight of synthetic graphite
from 2 to 12% by weight of inorganic additives.

The synthetic graphite component preferably consists of crystallographically well ordered polygranular electrographite and the inorganic component is preferably silicon dioxide. The dry mixture is then mixed with carbonizable organic compounds such as resin-containing binders and pitches, preferably a commercial binder pitch, whose softening point determined by the Krämer-Sarnow method (DIN 52 025) is preferably in the range from 70 to 110° C. and then pressed to form shaped bodies. Here, the proportion by mass of the binder based on the mass of the dry mixture is from 10% by weight to 50% by weight, preferably from 20% by weight to 40% by weight and particularly preferably from 30% by weight to 35% by weight. The shaped bodies obtained in this way can have the basic shape of the desired sliding elements or have another shape which is advantageous for further processing. The shaped bodies are then fired in the absence of oxidizing substances, preferably so as to reach product temperatures in the range from 800 to 1300° C. After cooling the bodies in an oxidation-inert atmosphere, they are, if appropriate, machined to produce the desired sliding elements and then passed to an impregnation step. For this purpose, they are impregnated by known methods with at least one of the materials from the group consisting of synthetic resins, pitches, metals, metal alloys and polymeric ceramic precursors. Synthetic resins and/or pitches and also polymeric ceramic precursors with which the bodies may have been impregnated are subsequently pyrolyzed during a further firing step. As resin, preference is given to using phenolic resin. As metal or alloy constituent, preference is given to using nickel, silver, copper or antimony, particularly preferably antimony. Polymeric ceramic precursors are, in particular, organometallic compounds. Preference is here given to silazanes, carbosilanes and siloxanes. The impregnated parts are then finally machined to bring them to the shape and surface quality required for use as sliding elements.

The sliding material of the first sliding element usually has a proportion of graphitized carbon black and/or natural graphite or from 17 to 56% by weight, based on the total mass, preferably from 26 to 51% by weight and particularly preferably from 34 to 48% by weight. The proportion of the total weight of the sliding material of the first sliding element which is made up by the impregnant is usually, if appropriate after carbonization or pyrolysis, from 15 to 40% by weight, preferably from 15 to 30% by weight and particularly preferably from 20 to 25% by weight.

The sliding material of the first sliding element thus has a structure in which the graphitic fillers such as the graphitized carbon black and/or natural graphite and the other synthetic graphite components of the dry mixture are embedded in a carbonized, nongraphitic matrix, with the pores of the material being filled by the impregnant. This material is thus distinct both from the customarily fired carbon materials which have no graphite structure at all and from graphite materials which have a continuous graphitic structure.

The first sliding element can additionally have a metal oxide layer on at least part of its surface. Such a layer may be made up of, inter alia, the oxides of nickel, silver, copper and antimony and their alloys. The metal oxide layer can have been produced, for example, by the customary deposition processes of thin layer technology (e.g.: CVD, PVD, MBE). The metal oxide layer of the first sliding element particularly preferably comprises an oxide of the metal or metal alloy with which the sliding material of the sliding element has been impregnated. The thickness of the metal oxide layer is usually less than 100 $\mu$m, preferably less than 1 $\mu$m, and particularly preferably less than 10 $\mu$m. If the second sliding element likewise consists of a carbon material, this too can have such a metal oxide layer on at least part of its surface.

According to the invention, free surfaces of the sliding elements which are exposed to supercritical steam can be provided with a layer which reflects infrared radiation, preferably a gold coating, and/or a thermally insulating layer, preferably of zirconium oxides ($ZrO$ and/or $ZrO_2$).

These layers make it possible to prevent or reduce both heat losses in the working space and chemical attack on the coated surfaces.

The technical data of the sliding material of the first sliding element of an example of a pair of sliding elements according to the invention are as follows:

Dry Mixture Composition

75% by weight of carbon black graphite,

23% by weight of crystalline natural graphite,

2% by weight of minerals,

35% by weight (of the dry mixture) of binder pitch.

Particle Size of the Dry Mix:

| | |
|---|---|
| $d_{50\%}$ | 17 μm |
| $d_{95\%}$ | 45 μm |

Production methods as described above. Impregnation with antimony.

These sliding elements were characterized by the following properties:

| | |
|---|---|
| Hardness (HR) (DIN 51917) | 115 |
| Density (DIN IEC 413) | 2.2 g/cm$^3$ |
| Flexural strength (DIN 51902) | 80 N/mm$^2$ |
| Thermal conductivity (DIN 51908) | 20 W/mK |

The sliding material of the second sliding element in the present example comprises an austenitic steel 1.4876 (DIN designation: X10NiCrAlTi32-20) which is coated with an amorphous diamond-like carbon layer (DLC layer) which has been deposited on the steel by means of CVD or PVD processes.

In the following, the present example of the pair of sliding elements according to the invention is compared with two comparative pairs of sliding elements in which the first sliding element consists of a different material, while the material of the second sliding element was not altered.

The material of the first sliding element of the comparative pair 1 of sliding elements is a carbon material which has been produced from mesophase powder.

On the other hand, the material of the first sliding element of the comparative pair 2 of sliding elements is an antimony-impregnated carbon material in which only synthetic graphite is embedded as filler in a carbonized, nongraphitic matrix.

The sliding properties of the pairs of sliding elements described were determined on a high-temperature tribometer which was operated using a pen/disk arrangement. The experiments were carried out under deionized steam at a temperature of 400° C.

The volumetric wear $W_v$ was determined in accordance with DIN 50321 as wear parameter. From this, the wear coefficient $k_v$, which is independent of the normal force $F_N$ acting during sliding friction and the sliding distance s, was determined from the equation:

$$k_v = W_v/(F_N s)$$

Furthermore, the coefficient of friction was determined after a sliding distance of 20 000 m.

TABLE 1

| | Volumetric wear $W_v$ [mm$^3$] | Wear coefficient $k_v$ [mm$^3$/Nm] | Coefficient of friction after 20 000 m |
|---|---|---|---|
| Pair of sliding elements according to the invention | 0.15 | 7.65 × 10$^{-7}$ | 0.03 |
| Comparative pair 1 of sliding elements | 0.66 | 3.30 × 10$^{-6}$ | 0.07 |
| Comparative pair 2 of sliding elements | 3.45 | 1.73 × 10$^{-5}$ | 0.05 |

What is claimed is:

1. A pair of sliding elements for machine parts exposed to high-pressure and high-temperature steam, preferably a piston-cylinder arrangement for steam engines, having a first sliding element which has been produced from a material consisting essentially of carbon, preferably a piston or piston ring, and a second sliding element, preferably a cylinder liner or guide bush,
   characterized in that the material consisting essentially of carbon of the first sliding element is a synthetics fired but not graphitized carbon material which comprises graphitized carbon black and/or natural graphite as significant filler and whose pores are filled with metal, a metal alloy, a ceramic, a synthetic resin and/or pitch which has been carbonized, and in that the material of the second sliding element is an iron-containing, high-temperature-resistant material, preferably a material alloyed with chromium and/or nickel which is provided at least on the sliding surface with a nitride layer.

2. A pair of sliding elements as claimed in claim 1, characterized in that the second sliding element is produced from high-temperature-resistant material alloyed with chromium and/or nickel and has been produced by a powder-metallurgical route.

3. A pair of sliding elements as claimed in claim 1, characterized in that the high-temperature-resistant material of the second sliding element preferably contains 15–25% by weight of chromium and/or 25–40% by weight of nickel.

4. A pair of sliding elements as claimed in claim 1,
   characterized in that free surfaces of the machine parts which are exposed to supercritical steam are provided with a layer which reflects infrared radiation, preferably a gold coating.

5. A pair of sliding elements as claimed in claim 1,
   characterized in that free surfaces of the machine parts which are exposed to supercritical steam are provided with a thermally insulating layer, preferably of zirconium oxide.

6. A pair of sliding elements as claimed in claim 1,
   characterized in that the material of the second sliding element is provided with a wear-protection layer.

7. A pair of sliding elements as claimed in claim 6, characterized in that the wear-protection layer is a titanium nitride, chromium nitride or chromium carbide layer or an amorphous diamond-like carbon layer.

8. A pair of sliding elements as claimed in claim 1,
   characterized in that the material consisting essentially of carbon of the first sliding element is impregnated with nickel, silver, copper, antimony or alloys thereof.

9. A pair of sliding elements as claimed in claim 1, characterized in that the material consisting essentially of carbon of the first sliding element contains from 17 to 56% by weight of graphitized carbon black and/or natural graphite, preferably from 26 to 51% by weight and particularly preferably from 34 to 48% by weight.

10. A pair of sliding elements as claimed in claim 1, characterized in that the dry mix component used in the production of the material consisting essentially of carbon of the first sliding element comprised from 30 to 100% by weight of grapitized carbon black and/or natural graphite, preferably from 45 to 90% by weight and particularly preferably from 60 to 85% by weight.

11. A pair of sliding elements as claimed in claim 1, characterized in that the material consisting essentially of carbon of the first sliding element further comprises, as additional components, synthetic graphite and/or inorganic additives.

12. A pair of sliding elements as claimed in claim 1, characterized in that the dry mix component used in the production of the material consisting essentially of carbon of the first sliding element further comprised, as additional components, synthetic graphite and/or inorganic additives.

13. A pair of sliding elements as claimed in claim 1, characterized in that the material consisting essentially of carbon of the first sliding element comprises from 15 to 40% by weight of metal, a metal alloy, ceramic or synthetic resin and/or pitch which has been carbonized, preferably from 15% by weight to 30% by weight and particularly preferably from 20% by weight to 25% by weight.

14. A pair of sliding elements as claimed in claim 13, characterized in that the metal is antimony.

15. A pair of sliding elements as claimed in claim 1, characterized in that the first sliding element has a metal oxide layer on at least part of its surface.

16. A pair of sliding elements as claimed in claim 15, characterized in that the pores of the material consisting essentially of carbon of the first sliding element are filled with metal or a metal alloy and in that the metal oxide layer of the first sliding element comprises an oxide of this metal or this metal alloy.

17. A pair of sliding elements as claimed in claim 15, characterized in that the second sliding element comprises a carbon material which consists of or consists essentially of graphite and has a metal oxide layer on at least part of its surface.

18. A pair of sliding elements for machine parts exposed to high-pressure and high-temperature steam, preferably a piston-cylinder arrangement for steam engines, having a first sliding element which has been produced from a material consisting essentially of carbon, preferably a piston or piston ring, and a second sliding element, preferably a cylinder liner or guide bush,
characterized in that the material consisting essentially of carbon of the first sliding element is a synthetic, fired but not graphitized carbon material which comprises graphitized carbon black and/or natural graphite as significant filler and whose pores are filled with metal, a metal alloy, a ceramic, a synthetic resin and/or pitch which has been carbonized, and in that the second sliding element comprises a light metal alloy, preferably comprising two or more of the materials Al, Mg, Ti.

19. A pair of sliding elements for machine parts exposed to high-pressure and high-temperature steam, preferably a piston-cylinder arrangement for steam engines, having a first sliding element which has been produced from a material consisting essentially of carbon, preferably a piston or piston ring, and a second sliding element, preferably a cylinder liner or guide bush,
characterized in that the material consisting essentially of carbon of the first sliding element is a synthetic, fired but not graphitized carbon material which comprises graphitized carbon black and/or natural graphite as significant filler and whose pores are filled with metal, a metal alloy, a ceramic, a synthetic resin and/or pitch which has been carbonized, and in that the second sliding element comprises a material which has been produced by a powder-metallurgical route and comprises iron or steel and titanium carbides.

20. A pair of sliding elements for machine parts exposed to high-pressure and high-temperature steam, preferably a piston-cylinder arrangement for steam engines, haling a first sliding element which has been produced from a material consisting essentially of carbon, preferably a piston or piston ring, and a second sliding element, preferably a cylinder liner or guide bush,
characterized in that the material consisting essentially of carbon of the first sliding element is a synthetic, fired but not graphitized carbon material which comprises graphitized carbon black and/or natural graphite as significant filler and whose pores are filled with a metal, a metal alloy, a ceramic, a synthetic resin and/or pitch which has beep carbonized, and in that the second sliding element comprises cemented hard material or has a sliding layer of cemented hard material.

21. A pair of sliding elements for machine parts exposed to high-pressure and high-temperature steam, preferably a piston-cylinder arrangement for steam engines, having a first sliding element which has been produced from a material consisting essentially of carbon, preferably a piston or piston ring, and a second sliding element, preferably a cylinder liner or guide bush,
characterized in that the material consisting essentially of carbon of the first sliding element is a synthetic, fired but not graphitized carbon material which comprises graphitized carbon black and/or natural graphite as significant filler and whose pores are filled with a metal, a metal alloy, a ceramic, a synthetic resin and/or pitch which has been carbonized, and in that the second sliding element is made of a ceramic composite which preferably comprises titanium carbide, chromium and nickel.

22. A pair of sliding elements as claimed in claim 21, characterized in that the ceramic composite further comprises manganese.

23. A pair of sliding elements for machine parts exposed to high-pressure and high-temperature steam, preferably a piston-cylinder arrangement for steam engines, having a first sliding element which has been produced from a material consisting essentially of carbon, preferably a piston or piston ring, and a second sliding element, preferably a cylinder liner or guide bush,
characterized in that the material consisting essentially of carbon of the first sliding element is a synthetic, fired but not graphitized carbon material which comprises graphitized carbon black and/or natural graphite as significant filler and whose pores are filled with a metal, a metal alloy, a ceramic, a synthetic resin and/or pitch which has been carbonized, and in that the second sliding element comprises a carbon material which consists of or consists essentially of graphite.

* * * * *